United States Patent
Ahmed et al.

(10) Patent No.: US 9,610,610 B2
(45) Date of Patent: Apr. 4, 2017

(54) METHOD FOR MAKING GLOVES

(75) Inventors: Syed Umair Ahmed, Karachi (PK); Raja Rizwan Ahmed, Karachi (PK); Mikhail Kassam, Toronto (CA)

(73) Assignee: Midas Safety Innovations Limited, St. Helier (JE)

(*) Notice: Subject to any disclaimer, the term of this patent is extended or adjusted under 35 U.S.C. 154(b) by 1066 days.

(21) Appl. No.: 13/477,293

(22) Filed: May 22, 2012

(65) Prior Publication Data

US 2013/0133126 A1 May 30, 2013

(30) Foreign Application Priority Data

May 27, 2011 (GB) .................................. 1109003.2

(51) Int. Cl.
| | | |
|---|---|---|
| *B05D 5/02* | (2006.01) | |
| *A41D 19/00* | (2006.01) | |
| *A41D 19/015* | (2006.01) | |
| *B29C 41/20* | (2006.01) | |
| *B29D 99/00* | (2010.01) | |
| *B29C 41/14* | (2006.01) | |
| *B29L 31/48* | (2006.01) | |
| *B29C 41/08* | (2006.01) | |
| *B29C 41/10* | (2006.01) | |
| *B29C 41/22* | (2006.01) | |
| *B29K 27/06* | (2006.01) | |
| *B29C 59/02* | (2006.01) | |

(52) U.S. Cl.
CPC ........... *B05D 5/02* (2013.01); *A41D 19/0055* (2013.01); *A41D 19/0058* (2013.01); *A41D 19/01558* (2013.01); *B29C 41/20* (2013.01); *B29D 99/0067* (2013.01); *B29C 41/08* (2013.01); *B29C 41/10* (2013.01); *B29C 41/14* (2013.01); *B29C 41/22* (2013.01); *B29C 2059/028* (2013.01); *B29K 2027/06* (2013.01); *B29L 2031/4864* (2013.01)

(58) Field of Classification Search
CPC B05D 5/02; A41D 19/0055; A41D 19/01558; A41D 19/0058; B29C 41/08; B29C 41/10; B29C 41/14; B29C 41/22; B29K 2027/06; B29L 2031/4864
USPC ................... 2/167, 168, 161.7, 169
See application file for complete search history.

(56) References Cited

U.S. PATENT DOCUMENTS

| | | | | |
|---|---|---|---|---|
| 2,434,035 A | * | 1/1948 | De Laney | B29D 99/0067 2/168 |
| 2,867,849 A | * | 1/1959 | Drew | B29C 41/14 264/233 |
| 2,997,746 A | | 8/1961 | O'Brien | |
| 4,284,275 A | * | 8/1981 | Fletcher | A63B 49/08 264/293 |
| 4,329,312 A | * | 5/1982 | Ganz | A61B 19/04 2/168 |
| 4,497,072 A | | 2/1985 | Watanabe | |
| 5,284,607 A | * | 2/1994 | Chen | A61B 19/04 264/130 |
| 5,438,709 A | * | 8/1995 | Green | A61B 19/04 2/167 |
| 5,500,469 A | * | 3/1996 | Johnsen | C08K 5/41 128/844 |
| 6,019,922 A | * | 2/2000 | Hassan | A41D 19/0058 264/130 |
| 6,254,947 B1 | * | 7/2001 | Schaller | A41D 19/0058 2/161.7 |
| 7,037,579 B2 | * | 5/2006 | Hassan | B29C 41/14 428/295.1 |
| 7,814,570 B2 | | 10/2010 | Hassan | |
| 2003/0204893 A1 | * | 11/2003 | Chou | A61L 31/16 2/161.6 |
| 2005/0035493 A1 | * | 2/2005 | Flather | B29C 41/14 264/305 |
| 2005/0222543 A1 | * | 10/2005 | Shao | A61L 31/10 604/292 |
| 2007/0192929 A1 | | 8/2007 | Flather | |
| 2007/0204381 A1 | * | 9/2007 | Thompson | A41D 19/0065 2/159 |
| 2009/0255033 A1 | * | 10/2009 | Chen | A61B 19/04 2/161.7 |

FOREIGN PATENT DOCUMENTS

| | | |
|---|---|---|
| EP | 2399720 A1 | 12/2011 |
| GB | 1176957 A | 1/1970 |
| GB | 1235282 A | 6/1971 |
| JP | 2906230 B | 6/1999 |
| JP | 2002020913 A | 1/2002 |
| JP | 2002249909 A | 9/2002 |

OTHER PUBLICATIONS

Machine Translation of JP 2002-020913 http://dossier1.j-plat.inpit.go.jp (translation performed on Oct. 28, 2015).*

* cited by examiner

*Primary Examiner* — Alissa L Hoey
(74) *Attorney, Agent, or Firm* — Marshall & Melhorn, LLC

(57) ABSTRACT

An embodiment is disclosed of a method of making gloves, more particularly polyvinyl chloride (PVC) coated gloves. The method comprises providing a liner, and coating at least a part of the liner with a PVC paste to form a coating having an outer layer, applying particles of a soluble solid to the outer layer of the coating and curing the outer layer. Preferably, the method further comprises gelling the outer layer after applying the particles and contacting the gelled outer layer with a solvent before curing. Preferably, the soluble solid comprises a solid acid.

10 Claims, No Drawings

METHOD FOR MAKING GLOVES

BACKGROUND OF THE INVENTION

The present invention relates to methods for making gloves, more particularly polyvinyl chloride (PVC) coated gloves. The invention also relates to PVC coated gloves with a rough surface.

Gloves with enhanced gripping characteristics are desirable in many fields of industry. In particular, synthetic or natural latex rubber gloves have been manufactured by various routes. For example U.S. Pat. No. 7,814,570 discloses synthetic or natural latex gloves without liners, which have a roughened surface obtained by using a tacky polymeric coagulant with the coagulant particles forming impressions on the latex glove surface.

Similar techniques are disclosed in US-A-2007/0192929 relating, again to latexes of natural or synthetic rubber.

U.S. Pat. No. 4,497,072 relates to coated gloves with a rubber or resin (such as vinyl resin) coating which ensures adequate ventilation. This is achieved in U.S. Pat. No. 4,497,072 by coating a liner of the glove with a foaming resin solution and subsequently applying low pressure to the coating in order to burst the small bubbles on the surface. After curing, a porous surface is produced improving grip as well as ventilation.

There is, however, a need to provide improved grip for other types of gloves in particular gloves based on polyvinyl chloride having a liner. Although, generally, such gloves have reasonably good grip in dry conditions (and occasionally also in the presence of water) PVC gloves generally have poor or very poor grip in oily conditions.

It is an aim of the present invention to provide methods of making gloves using PVC which provides significantly enhanced grip, feel for the user and also appearance compared to known PVC gloves.

DETAILED DESCRIPTION OF THE INVENTION

The present invention accordingly provides a method for making a glove, the method comprising, a) providing a liner, b) coating at least part of the liner with a polyvinyl chloride paste (comprising, for example, an organosol of PVC and/or a plastisol of PVC) to form an outer layer, c) applying particles of a soluble solid to the outer layer, and d) curing the outer layer. The soluble solid may, in general, be soluble in any suitable solvent. Solvents that may be suitable include oxygen containing organic solvents such as alcohols (e.g. ethanol, methanol and/or propanol) or ether. However, the preferred solvent is water or an aqueous solution.

Preferably, the method further comprises at least partially gelling the outer layer after applying the particles of the water soluble solid and subsequently contacting the at least partly gelled outer layer with the solvent (preferably water or aqueous solution) before curing the outer layer.

The result of the method according to the present invention, after solvent treatment (i.e. leaching) is that the particles of the soluble solid dissolve leaving indentations in the surface of the glove which significantly enhance the grip of the glove. The invention is particularly advantageous because since the particle size of the particles will generally vary, indentations of varying sizes will be provided on the outer layer.

Not only does such a glove provide advantages relating to grip but additionally, and surprisingly, it has been discovered that the feel to the wearer of such a glove is enhanced (soft feel). The appearance of the glove is also strikingly different from prior art PVC gloves.

The method can be used to produce generally porous, breathable single layer general purpose handling gloves if only a single, outer layer of PVC is coated.

However, preferably, the method may further comprise coating at least part of the liner with at least one polymeric material to form an inner layer (preferably a liquid impermeable or liquid-proof layer) before coating to form the outer layer.

The polymeric coating will usually also comprise polyvinyl chloride paste, which may comprise a PVC organosol and/or a PVC plastisol.

Generally, the inner and outer layers will be formed with polyvinyl chloride paste of somewhat different viscosities.

It is preferred if the inner layer is provided over substantially the whole surface area of the liner whereas the outer layer is provided only over a portion of the inner layer in particular palm, palm-side of the fingers and back of the fingers.

Usually, the process will involve the inner layer being at least partially gelled before coating to form the outer layer. Preferably the inner layer is not fully gelled to improve adhesion to the outer layer. Two (or more) layers are advantageous because it ensures that different PVC pastes may be used having different properties, for example with different colours or with different types or amounts of other additives.

If the inner layer is at least partially gelled before coating to form the outer layer, then there will, in general, be less bleed between the outer layer and inner layer during subsequent processing.

Generally, the method of the invention will further comprise one or more washing and drying steps. At least one washing/drying step will usually occur after curing of the glove. The washing will usually take place for 10 to 16 minutes at warm to hot water temperatures (e.g. 30 to 60° C.). Drying will generally either be drain drying, or spin drying (with or without enhanced air flow).

The soluble solid may be generally any soluble solid, preferably a water soluble solid. Examples include sucrose, salts (e.g. sodium chloride), soap powder.

However, in a preferred embodiment of the present invention, the (water) soluble solid comprises a solid acid.

The solid acid may be a dicarboxylic acid. Suitable dicarboxylic acids include oxalic acid, malonic acid, succinic acid, glutaric acid and/or adipic acid.

However, preferably, the solid acid comprises an α hydroxy acid.

The most suitable α hydroxy acids include citric acid, tartaric acid, malic acid, lactic acid, glycolic acid and/or mandelic acid. Of these acids, the most preferred solid acid is citric acid.

Generally, the coating of the outer layer will be selected from shower coating, spray coating and/or dip coating.

In a preferred embodiment of the present invention the first coating (preferably with PVC paste) to form the inner layer will be a shower coating or spray coating whereas the second coating to form the outer layer will comprise a dip coating process usually using a paste having lower viscosity than that of the optional inner layer paste.

The method of applying the particles may be selected from sprinkling the particles on the outer layer, spraying the particles, shower coating with the particles or fluidised bed applications. The preferred fluidised bed application is a dip application process into a fluidised bed of the solid particles.

Generally, the particle size of the solid particles will be such that between 50 and 99% preferably 55 to 90%, more preferably 60 to 85%, most preferably 60 to 80% of the particles have a particle size in the range of 400 to 900 μm. Usually, 10% or less preferably 7% or less of the particles will have a particle size above 2300 μm.

Gloves produced according to the invention have an unusual and striking roughened PVC surface leading to enhanced grip and improved, soft feel for the wearer.

Consequently, in a second aspect the present invention provides a coated glove, the outer layer of the coating on the glove comprising polyvinyl chloride having a rough surface comprising indentations wherein 50% to 99% of the indentations have a size in the range of 400-900 μm.

Generally, gloves produced according to the first aspect of the invention will be chemically resistant and are particularly useful in an industrial environment involving handling of chemicals.

The glove liner may be generally of any suitable material. Suitable liner materials include aramid (either meta or para aramid, polyamides (e.g. nylon), polyester, cellulosics (e.g. linen, cotton), PBP P-phenylene 2,6,benzobizoxazole, polyester, acrylic, polyolefin, polyvinyl alcohols, metal fibres, glass fibres, silk, wool, acetate, PTFE, carbon fibre, Rayon™, bamboo fibre, polybenzimidazole, Lycra™ or a mixture of one or more of these materials. The liner may be produced in any generally known way including by cut and sewing, knitting (warp or in particular weft knitting), weaving or by a non-woven technique.

Generally, at least partial gelling (e.g. pre-gelling) is performed at a temperature of 105 to 180° C. for up to 5 minutes.

Leaching in water or aqueous solution (e.g. aqueous alkali) in order to remove the water soluble particles is preferably performed at a temperature of below 60° C. (water temperature) for between 1 and 15 minutes, preferably 1 to 7 minutes.

Final curing will generally be performed at between 160 and 190° C. for 4 to 25 minutes in particular for 6 to 16 minutes and most preferably for between 8 to 10 minutes.

Preferably, after coating with the or each PVC paste, the liner will be drained (typically for 30 minutes or so) and then spun (at a spinning rate of between 10 and 30 RPM for 10 to 50 seconds both clockwise and anticlockwise).

Drain and spin is usually performed prior to gelling in preferred aspects of the present invention in each of the steps of the process.

Embodiments of the invention will now be described with reference to the example, described below in which PVC coated gloves were produced according to the method of the invention.

In the Example, two PVC layers were deposited on a cotton, knitted gauntlet liner. The liner was produced by weft-knitting at gauge 24 circular interlock knitting machine using 30's single cotton count ring spun yarn.

After manufacture, the liner was singed, in order to remove hairs to smooth the surface. The first and the second layers were deposited from a formulation as indicated in Table 1.

The formulation for the first, inner layer coating was of viscosity 5000 to 8000 cps (at 30° C.). The viscosity of the paste for the second, outer layer coating was between 3000 and 4000 cps (at 30° C.).

The difference in viscosity was provided by adjusting the amount of thickener/viscosity adjuster in the paste.

The process involved the following steps:
1. The liner was loaded upon the former and singed.
2. The first, inner layer, was deposited by shower coating the liner with the first PVC paste.
3. The glove was drained for 90 s (fingers down).
4. The liner was spun at 20 rpm for 30 seconds clockwise and then 20 rpm for 30 seconds anticlockwise in order to reduce the time necessary to drain.
5. The inner layer was pre-gelled (i.e. partially gelled) at 180° C. for 2 minutes.
6. After pre-gelling, the second, outer layer was coated upon the inner layer by dip coating in the second PVC paste up to the wrist covering the palm, fingers and a portion of the back of the fingers.
7. The glove was drained for 90 s and spun at 20 rpm for 30 seconds clockwise and then 20 rpm for 30 seconds anti-clockwise.
8. Citric acid powder (mesh size 8 to 80 approximately 5% 8 mesh size, 20 mesh size 65%, 40 mesh size 25%, and 80 mesh size 5% obtained from BBCA Biochemical was sprinkled upon the outer layer.
9. The outer layer was gelled by heating at 180° C. for 2 minutes.
10. The citric acid powder was leached by treatment in water for 5 minutes at 50° C. and then dried in air.
11. The final curing of the glove was performed at 180° C. for 12 to 14 minutes.
12. Finally, the glove was washed after curing in water at 50° C. for 30 minutes.
13. The glove was spun dry in a Hydro before loading on a hand-shaped former and dried at 100° C. for 15 minutes.

The glove as prepared (and according to the invention) has a striking appearance and significantly enhanced grip as well as a soft feel for the user.

Gloves such as these find use in many areas of industry especially where protection from chemicals or enhanced oil grip is necessary.

TABLE 1

Formulation for first and second PVC coating parts. PHR refers to parts per hundred resin

| Component | Amount/PHR | Notes |
| --- | --- | --- |
| Pevikon P737 | 83 | Paste-making vinyl chloride mono polymer |
| PVC Resin SPRD | 17 | Vinyl chloride/vinyl acetate copolymer, blending resin |
| Palatinol AH (DOP/DEHP) | 96.87 | Plasticizer (dioctyl phthalate, di-2-ethylhexyl phthalate) |
| Santicizer 160/Unimol BB | 19.8 | Plasticizer (butyl benzyl phthalate) |
| Calcium Stearate | 2 | Stabiliser |
| Mark 1495C | 1.5 | Heat stabiliser |
| Epoxidised Soyabean Oil | 5 | Stabiliser to separate Cl |
| Aerosil 200 | 0.1 | Thickener (fumed silica 200 $m^2$/g surface area) |
| Agitan 6236M | 0.1 | Viscosity adjuster (blend of mineral oil and non-ionic surfactant) ant-foam |
| Pigment | 0.83 | Colour |

Gloves produced according to the Example were tested to determine the coefficient of friction in dry, wet (water) and oily conditions.

All the equipment used was calibrated.

The apparatus used is designed to determine the coefficient of friction between two flat surfaces which are under a predetermined load. The measurements were taken at 500 mm/min at ambient temperature under dry, water wet and oil (10W 40 commercial engine oil) contaminated.

Each test specimen was taken from the palm of the glove (the area of maximum grip) as this was the only place that generally a significant amount of material could be obtained. The palm material was clamped and draped over a 30 mm diameter rubber button which was approximately 9 mm high and had an approximate harness of 55 IRHD. By clamping the test specimen at one end, the material became taut naturally during the test.

The water wet and oil contaminated test specimens were conditioned in the respective fluids for a minimum of 30 minutes prior to testing.

The bearing surface was a ground steel plate having a surface roughness of less than 1 μm $R_a$. The same bearing surface was used for the dry, the water wet and finely the oil test.

With the test specimen mounted in the jig and adjusted so that it just touched the bearing surface, the load of 5 kg (49.1 N) was applied to the test specimen/bearing surface assembly by means of a bearing mounted in a bell crank. The bearing surface was then drawn over the test specimen and the resulting force required measured. At the end of the 50 mm travel the load was removed, the bearing surface returned to the start position and the procedure repeated. Three results were obtained for each sample, the load for the Coefficient of Friction calculation was taken as the mean value from the straighter end portion of the graph, generally the 20 mm to 50 mm portion.

The results of the determination compared to a conventional, dipped PVC glove with a smooth surface are described in Table 2.

TABLE 2

| Sample | Dry | Wet (water) | Oil |
|---|---|---|---|
| Example | 1.11 | 0.87 | 0.24 |
| Conventional PVC glove | 3.19 | 3.34 | 0.04 |

The results in Table 2 show that the gloves according to the invention have good dry and wet (water) function and much better function in oil compared to conventional PVC gloves. A coefficient of friction of 0.04 is similar to the coefficient of dry PTFE.

The invention claimed is:

1. A method for making a glove, the method comprising:
 a) providing a liner,
 b) coating at least part of the liner with at least one polymeric material comprising a polyvinyl chloride plastisol paste to form an inner layer,
 c) gelling or partially gelling the inner layer to form a gelled or partially gelled inner layer,
 d) coating at least a portion of the gelled or partially gelled inner layer with a polyvinyl chloride plastisol paste to form an outer layer,
 e) applying particles of a water soluble solid comprising an α hydroxyl acid to the outer layer, wherein 50 to 99% of the particles have a particle size in the range 400 to 900 μm,
 f) gelling or partially gelling the outer layer to form a gelled or partially gelled outer layer,
 g) leaching the gelled or partially gelled outer layer with a solvent, so that the particles of the water soluble solid comprising an α hydroxyl acid dissolve, leaving indentations in the outer layer, and
 h) curing the outer layer.

2. A method as claimed in claim 1, wherein the solvent comprises water or an aqueous solution.

3. A method as claimed in claim 1, further comprising one or more washing and drying steps.

4. A method as claimed in claim 1, wherein the α hydroxyl acid is selected from one or more of citric acid, tartaric acid, malic acid, lactic acid, glycolic acid or mandelic acid.

5. A method as claimed in claim 1, wherein one or both of the coating to form the inner layer and the coating to form the outer layer is applied by shower coating, spray coating or dip coating.

6. A method as claimed in claim 5, wherein the inner layer is applied by shower coating or spray coating and the outer layer is applied by dip coating.

7. A method as claimed in claim 1, wherein applying the particles is by sprinkling the particles, spraying the particles, shower coating with the particles or by fluidised bed application.

8. A method as claimed in claim 1, wherein 10% or less of the particles have a particle size above 2300 μm.

9. A method as claimed in claim 1, wherein the polyvinyl chloride paste used to form the outer layer has a lower viscosity than that of the polyvinyl chloride paste used to form the inner layer.

10. A method as claimed in claim 1, wherein the inner layer is provided over substantially the whole surface area of the liner.

* * * * *